(12) United States Patent
Brockschmidt et al.

(10) Patent No.: US 9,884,950 B2
(45) Date of Patent: Feb. 6, 2018

(54) IMPREGNATING RESIN FOR AN ELECTRICAL INSULATION BODY, ELECTRICAL INSULATION BODY, AND METHOD FOR PRODUCING THE ELECTRICAL INSULATION BODY

(71) Applicant: Siemens Aktiengesellschaft, Munich (DE)

(72) Inventors: Mario Brockschmidt, Essen (DE); Friedhelm Pohlmann, Essen (DE); Frank Rainer, Oberhausen (DE)

(73) Assignee: Siemens Aktiengesellschaft, Munich (DE)

( * ) Notice: Subject to any disclaimer, the term of this patent is extended or adjusted under 35 U.S.C. 154(b) by 170 days.

(21) Appl. No.: 14/763,806

(22) PCT Filed: Jan. 24, 2014

(86) PCT No.: PCT/EP2014/051358
§ 371 (c)(1),
(2) Date: Jul. 27, 2015

(87) PCT Pub. No.: WO2014/118081
PCT Pub. Date: Aug. 7, 2014

(65) Prior Publication Data
US 2015/0361245 A1 Dec. 17, 2015

(30) Foreign Application Priority Data
Feb. 4, 2013 (EP) ..................... 13153791

(51) Int. Cl.
| | | |
|---|---|---|
| B32B 27/26 | (2006.01) | |
| B32B 27/40 | (2006.01) | |
| B32B 27/38 | (2006.01) | |
| B32B 27/36 | (2006.01) | |
| B32B 27/28 | (2006.01) | |
| B32B 27/20 | (2006.01) | |
| B32B 27/04 | (2006.01) | |
| C08J 5/24 | (2006.01) | |
| C08K 3/34 | (2006.01) | |
| B82Y 30/00 | (2011.01) | |
| H01B 3/40 | (2006.01) | |
| H02K 3/30 | (2006.01) | |
| H02K 3/40 | (2006.01) | |
| C08K 3/22 | (2006.01) | |
| C08K 3/28 | (2006.01) | |
| C08K 3/36 | (2006.01) | |
| C08L 63/00 | (2006.01) | |

(52) U.S. Cl.
CPC ............ C08K 3/34 (2013.01); B82Y 30/00 (2013.01); C08J 5/24 (2013.01); C08K 3/22 (2013.01); C08K 3/28 (2013.01); C08K 3/36 (2013.01); H01B 3/40 (2013.01); H02K 3/30 (2013.01); H02K 3/40 (2013.01); C08K 2003/221 (2013.01); C08K 2003/2227 (2013.01); C08K 2003/2241 (2013.01)

(58) Field of Classification Search
None
See application file for complete search history.

(56) References Cited

U.S. PATENT DOCUMENTS

| | | |
|---|---|---|
| 5,075,159 A | 12/1991 | Koyama et al. |
| 7,098,258 B2 | 8/2006 | Ideno et al. |
| 7,279,223 B2 | 10/2007 | Rubinsztajn |
| 7,550,097 B2 | 6/2009 | Tonapi et al. |
| 2005/0161210 A1* | 7/2005 | Zhong ................ C09K 5/14 165/185 |
| 2008/0039555 A1* | 2/2008 | Ruyters ............... C09J 9/02 523/429 |
| 2011/0119988 A1 | 5/2011 | Litz et al. |
| 2013/0131218 A1 | 5/2013 | Groeppel |

FOREIGN PATENT DOCUMENTS

| | | |
|---|---|---|
| CN | 1040383 A | 3/1990 |
| CN | 1064171 A | 9/1992 |
| CN | 1594426 A | 3/2005 |
| CN | 1918216 A | 2/2007 |
| CN | 101815720 A | 8/2010 |
| CN | 102295878 A | 12/2011 |
| JP | 2000178324 A | 6/2000 |
| JP | 2006249276 A | 9/2006 |
| JP | 2007504663 A | 3/2007 |

(Continued)

OTHER PUBLICATIONS

JP Office Action dated Sep. 12, 2016, for JP application No. 2015-555658.
Database WPI Week 200668; Thomson Scientific; AN 2006-652066; XP002711413; 2006.
"Database WPI Week 201213"; Thomson Scientific; AN 2012-A73085; XP002711412; 2011.

Primary Examiner — Michael J Feely
(74) Attorney, Agent, or Firm — Beusse Wolter Sanks & Maire

(57) ABSTRACT

An impregnating resin for an electrical insulation body includes a base resin, a filler having nanoscale particles, and a radically polymerizing reactive diluent. The impregnating resin includes a crosslinker for crosslinking the base resin and the reactive diluents. The base resin is an epoxy resin. An electrical insulation body includes the impregnating resin and a method produces the electrical insulation body by production of an impregnating resin having a base resin, a filler having nanosize particles and a free-radically polymerizing reactive diluent.

16 Claims, No Drawings

(56) References Cited

FOREIGN PATENT DOCUMENTS

| | | |
|---|---|---|
| JP | 2010503975 A | 2/2010 |
| JP | 2010062297 A | 3/2010 |
| WO | 2005024942 A1 | 3/2005 |
| WO | 2008036151 A1 | 3/2008 |
| WO | 2012013439 A1 | 2/2012 |

* cited by examiner

IMPREGNATING RESIN FOR AN ELECTRICAL INSULATION BODY, ELECTRICAL INSULATION BODY, AND METHOD FOR PRODUCING THE ELECTRICAL INSULATION BODY

CROSS REFERENCE TO RELATED APPLICATIONS

This application is the US National Stage of International Application No. PCT/EP2014/051358 filed 24 Jan. 2014, and claims the benefit thereof. The International Application claims the benefit of European Application No. EP13153791 filed 4 Feb. 2013. All of the applications are incorporated by reference herein in their entirety.

FIELD OF INVENTION

The invention relates to an impregnating resin for an electrical insulation body, the electrical insulation body and a process for producing the electrical insulation body.

BACKGROUND OF INVENTION

Electric machines, e.g. motors and generators, have electrical conductors, a main insulation and a stator lamination stack. The main insulation serves the purpose of electrically insulating the conductors from one another, from the stator lamination stack and from the surroundings. During operation of the electric machine, sparks which can form "treeing" channels in the main insulation can occur as a result of electric partial discharges. The "treeing" channels can result in dielectric breakdown through the main insulation. A barrier against the partial discharges is achieved by the use of mica, which has a high partial discharge resistance, in the main insulation. The mica is used in the form of platelet-like mica particles having a conventional particle size of from a number of 100 microns to a number of millimeters, with the mica particles being processed to form a mica paper. To increase the strength and to improve the processability, an electrical insulation tape which has a support structure in addition to the mica paper is used.

To produce the main insulation, the electrical insulation tape is wound around the conductor. The electrical insulation tape is then impregnated with a synthetic resin and the synthetic resin is subsequently cured. To improve the partial discharge resistance of the main insulation, the use of nanosize particles which are dispersed in the synthetic resin before impregnation is known. However, the presence of the particles shortens the life of the synthetic resin. This shows up particularly in the form of progressive polymerization of the synthetic resin which leads to an increase in the viscosity of the synthetic resin and thus makes impregnation of the electrical insulation tape difficult.

SUMMARY OF INVENTION

It is an object of the invention to provide an impregnating resin for an electrical insulation body, with both the impregnating resin and the electrical insulation body having a long life.

The impregnating resin of the invention for an electrical insulation body comprises a base resin, a filler having nanosize particles and a free-radically polymerizing reactive diluent. The reactive diluent has a lower viscosity than the base resin, as a result of which it is possible to achieve a higher proportion by mass of the nanosize particles in the impregnating resin of the invention than in the case of a comparable impregnating resin having the same viscosity but no reactive diluent. The presence of the reactive diluent reduces the concentration of the base resin in the impregnating resin, as a result of which the polymerization rate of the base resin is reduced and its life is thus advantageously increased.

The ratio m(reactive diluent)/(m(base resin)+m(reactive diluent)) is preferably from 0.3 to 0.7, particularly preferably from 0.4 to 0.6, where m(base resin) and m(reactive diluent) are the masses of the base resin and of the reactive diluent, respectively, in the impregnating resin. This ratio advantageously makes it possible to achieve a particularly high proportion by mass of the nanosize particles in the impregnating resin together with a high strength of the cured impregnating resin.

The reactive diluent is preferably styrene, vinyltoluene, in particular o-vinyltoluene, m-vinyltoluene and/or p-vinyltoluene, and alkyl acrylate and/or alkanediol diacrylate, in particular hexanediol diacrylate, in particular 1,6-hexanediol diacrylate. These compounds advantageously have a particularly low viscosity; for example, the viscosity of styrene is in the range from 0.7 to 0.8 mPa·s and thus about 20% lower than the viscosity of water.

Preference is given to the base resin being an epoxy resin, a polyesterimide, in particular an unsaturated polyesterimide, a polyester, in particular an unsaturated polyester, and/or a polyurethane. The epoxy resin preferably comprises bisphenol A diglycidyl ether, bisphenol F diglycidyl ether, phenol novolacs, aliphatic epoxides and/or cycloaliphatic epoxides. Furthermore, preference is given to the epoxy resin comprising a cyclic carboxylic anhydride, in particular maleic anhydride, phthalic anhydride, methylhexahydrophthalic anhydride and/or hexahydrophthalic anhydride. Preference is also given to the epoxy resin having an amine as hardener. All the abovementioned base resins are resins which are not free-radially polymerizable and do not react with the free-radically polymerizable reactive diluent. As a result, and due to the presence of the reactive diluent reducing the concentration of the base resin in the impregnating resin, the rate of polymerization of the base resin is decreased. As a result, the impregnating resin advantageously has a particularly long life before impregnation.

The impregnating resin preferably comprises a crosslinker for crosslinking the base resin and the reactive diluent, in particular bicycle[2.2.1]hept-5-ene-2,3-dicarboxylic anhydride, 1-methylbicyclo[2.2.1]hept-5-ene-2,3-dicarboxylic anhydride, 2-methylbicyclo[2.2.1]hept-5-ene-2,3-dicarboxylic anhydride, 5-methylbicyclo[2.2.1]hept-5-ene-2,3-dicarboxylic anhydride and/or 7-methylbicyclo[2.2.1]hept-5-ene-2,3-dicarboxylic anhydride as the crosslinker.

During curing of the impregnating resin, the alkene group of the crosslinker is built into the polymeric network of the reactive diluent during the free-radical chain growth of the reactive diluent. At the same time, the anhydride group of the crosslinker is built into the polymeric network of the base resin. The crosslinker advantageously results in a high strength of the cured impregnating resin.

Preference is given to the impregnating resin comprising a second filler having particles which have an average particle diameter of from about 100 nm to about 100 μm. The nanosize particles and/or the particle of the second filler are preferably inorganic particles which comprise, in particular, aluminum oxide, aluminum hydroxide, silicon dioxide, titanium dioxide, rare earth oxide, alkali metal oxide, metal nitride and/or sheet silicates, in particular exfoliated or partially exfoliated sheet silicates. The nanosize particles can, for example, have been produced by an in-situ process or by means of a flame-pyrolitic process. The sheet silicates can be of either natural or synthetic origin. The materials mentioned for the particles do not accelerate the polymerization of the reactive diluent, so that the impregnating resin advantageously has a long life. The average particle diameter of the nanosize particles is preferably in the range from about 1 nm to about 100 nm. Silanization of the surfaces of the particles by reaction of the particles with alkylalkoxysilanes, in particular methyltrimethoxysilane, dimethyldimethoxysilane and/or trimethylmethoxysilane, enables the surface of the particles to be made organophilic so that the particles are advantageously more readily miscible with the mixture of the carboxylic anhydride and the oxirane and less strongly accelerate the polymerization of the base resin.

Preference is also given to the surfaces being silanized in such a way that the surfaces act as crosslinker for crosslinking the base resin and the reactive diluent.

The electrical insulation body of the invention comprises an electrical insulation tape, preferably an electrical insulation tape comprising mica and/or aluminum oxide, which is impregnated by the impregnating resin.

As a result of the impregnating resin of the invention being able to be produced with a higher proportion by mass of the nanosize particles than the comparable impregnating resin having the same viscosity but no reactive accelerator, the electrical insulation body can also be produced with a higher proportion by mass of nanosize particles than a comparable electrical insulation body having the comparable impregnating resin. As a result, the life of the electrical insulation body is longer than the life of the comparable electrical insulation body. The higher proportion by mass of the nanosize particles also increases the thermal conductivity of the electrical insulation body, which further increases its life.

The ratio m(impregnating resin)/(m(impregnating resin)+m(electrical insulation tape)) is preferably from 0.1 to 0.6, where m(impregnating resin) and m(electrical insulation tape) are the masses of the impregnating resin and of the electrical insulation tape, respectively, in the electrical insulation body. The high proportions by mass of the impregnating resin in the electrical insulation body can be achieved when the electrical insulation tape is impregnated by a "resin-rich process". Here, the impregnating resin is pressed by means of a heatable press into the electrical insulation tape and subsequently cured in the heatable press by supply of heat. Together with the high proportions by mass of the nanosize particles in the impregnating resin which can be achieved, proportions by mass of the nanosize particles in the electrical insulation body of above 50% can advantageously be achieved.

The electrical insulation tape of the electrical insulation body preferably comprises chromium acetalacetonate, Zn naphthenate and/or a compound having the structural formula $R^1CO^{2-}R^2CO^{2-}Zn^{2+}$ as reaction accelerator, where $R^1$ and $R^2$ are each, independently of one another, a straight-chain or branched alkyl group, in particular $C_6$-alkyl, $C_7$-alkyl, $C_8$-alkyl, $C_9$-alkyl or $C_{10}$-alkyl. The reaction accelerator accelerates the polymerization of the base resin and is preferably present in the electrical insulation tape before impregnation, so that the polymerization of the base resin advantageously takes place only after impregnation. The compound having the structural formula $R^1CO^{2-}R^2CO^{2-}Zn^{2+}$ is advantageously obtainable in a higher purity and with lower quality fluctuations than Zn naphthenate, so that the curing of the electrical insulation body can advantageously be effected more simply than when using Zn naphthenate.

The electrical insulation tape preferably comprises a free-radical initiator, in particular an alkyl peroxide, an alkoyl peroxide, an aryl peroxide, in particular dicumyl peroxide, and/or an aroyl peroxide, in particular 2,5-dimethyl-2,5-dibenzoylperoxyhexane and/or dibenzoyl peroxide. The free-radical initiator initiates the chain growth of the reactive diluent and is preferably present in the electrical insulation tape before impregnation, so that the polymerization of the reactive diluent advantageously takes place only after impregnation. The disintegration of the free-radical initiator and thus chain growth can be started, for example, by supply of heat or by irradiation with light, preferably UV light. Preference is given to the impregnating resin comprising benzoquinone as stabilizer for the free-radical polymerization.

The process of the invention for producing the electrical insulation body comprises the steps: a) production of the impregnating resin by means of a1) mixing of the filler with the reactive diluent; a2) mixing of the reactive diluent with the base resin; b) impregnation of the electrical insulation tape with the impregnating resin; c) curing of the impregnating resin.

As a result of the filler firstly being mixed with the reactive diluent, at least partial covering of the surface of the nanosize particles with the reactive diluent occurs, so that the base resin is at least partly shielded from the nanosize particles, resulting in the nanosize particles accelerating the polymerization of the base resin less strongly. A long life of the impregnating resin is therefore advantageously obtained despite the presence of the nanosize particles.

It is conceivable for the reactive diluent to be entirely or partly removed from the impregnating resin during or after impregnation. It is likewise conceivable for the reactive diluent to remain in the impregnating resin and be cured together with the impregnating resin.

The process for producing the electrical insulation body preferably comprises the step: a3) adjustment of the viscosity of the impregnating resin by increasing the viscosity by addition of an oligomer of the base resin or of an oligomer of a component of the base resin, in particular an oligomer of an epoxide having at least two epoxide groups, in particular an oligomer of bisphenol A diglycidyl ether and/or an oligomer of bisphenol F diglycidyl ether. The adjustment of the viscosity advantageously enables impregnation defects during impregnation to be prevented and an optimal proportion by means of impregnating resin in the electrical insulation body to be achieved.

DETAILED DESCRIPTION OF INVENTION

The invention is illustrated below with the aid of two examples.

In a first example, an impregnating resin is produced by firstly producing a mixture of styrene as reactive diluent and a filler including particles of titanium dioxide having an average particle diameter of 20 nm. The mixture is subsequently mixed with a base resin including a stoichiometric mixture of bisphenol A diglycidyl ether and phthalic anhydride. Here, the ratio m(reactive diluent)/(m(base resin)+m (reactive diluent)) is set to 0.4 and the ratio m(filler)/(m (filler)+m(reactive diluent)+m(base resin)) is set to from 0.05 to 0.6, where m(base resin), m(reactive diluent) and m(filler) are the masses of the base resin, of the reactive diluent and of the filler, respectively, in the impregnating resin.

An electrical insulation tape comprising mica is wound around an electrical conductor. The electrical insulation tape comprises Zn naphthenate as reaction accelerator for the base resin and dibenzoyl peroxide as free-radical initiator for the reactive diluent. The electrical insulation tape is impregnated by the impregnation resin in a "resin-rich process" in such a way that the ratio m(impregnating resin)/(m(impregnating resin)+m(electrical insulation tape))=0.5, where m(impregnating resin) and m(electrical insulation tape) are the masses of the impregnating resin and of the electrical insulation tape, respectively. Supply of heat cures the impregnating resin and produces an electrical insulation body.

In a second example, an impregnating resin is produced by firstly producing a mixture of vinyltoluene as reactive diluent and a filler including particles of aluminum oxide having an average particle diameter of 15 nm. The mixture is subsequently mixed with a base resin including a stoichiometric mixture of bisphenol F diglycidyl ether and maleic anhydride. Here, the ratio m(reactive diluent)/(m(base resin)+m(reactive diluent)) is set to 0.6 and the ratio m(filler)/(m(filler)+m(reactive diluent)+m(base resin)) is set to 0.5, where m(base resin), m(reactive diluent) and m(filler) are the masses of the base resin, of the reactive diluent and of the filler, respectively, in the impregnating resin. The impregnating resin further comprises 1 percent by mass of methylbicyclo[2.2.1]hept-5-ene-2,3-dicarboxylic anhydride as crosslinker.

An electrical insulation comprising mica is wound around an electrical conductor. The electrical insulation tape comprises Zn neodecanoate as reaction accelerator for the base resin and dicumyl peroxide as free-radical initiator for the reactive diluent. The electrical insulation tape is impregnated by the impregnating resin in a "resin-rich process" in such a way that the ratio m(impregnating resin)/(m(impregnating resin)+m(electrical insulation tape))=0.5, where m(impregnating resin) and m(electrical insulation tape) are the masses of the impregnating resin and of the electrical insulation tape, respectively. Supply of heat cures the impregnating resin and produces an electrical insulation body.

Although the invention has been illustrated and described in detail by means of the preferred examples, the invention is not restricted by the examples disclosed and a person skilled in the art will be able to derive other variations therefrom, without going outside the scope of protection of the invention.

The invention claimed is:

1. An electrical insulation body comprising:
   an electrical insulation tape which has been impregnated by an impregnating resin, wherein the impregnating comprises;
      a base resin, a filler having nanosize particles and a free-radically polymerizing reactive diluent,
      a crosslinker for crosslinking the base resin and the reactive diluent,
      wherein the reactive diluent is styrene, vinyltoluene, an alkyl acrylate and/or alkanediol diacrylate, and
      wherein the crosslinker is bicycle[2.2.1]hept-5-ene-2,3-dicarboxylic anhydride,
      1-methylbicyclo[2.2.1]hept-5-ene-2,3-dicarboxylic anhydride,
      2-methylbicyclo[2.2.1]hept-5-ene-2,3-dicarboxylic anhydride,
      5-methylbicyclo[2.2.1]hept-5-ene-2,3-dicarboxylic anhydride, and/or
      7-methylbicyclo[2.2.1]hept-5-ene-2,3-dicarboxylic anhydride.

2. The electrical insulation body as claimed in claim 1, wherein a ratio m(reactive diluent)/(m(base resin)+m(reactive diluent)) is from 0.3 to 0.7, where m(base resin) and m(reactive diluent) are the masses of the base resin and of the reactive diluent, respectively, in the impregnating resin.

3. The electrical insulation body as claimed in claim 1, wherein a ratio m(reactive diluent)/(m(base resin)+m(reactive diluent)) is from 0.4 to 0.6, where m(base resin) and m(reactive diluent) are the masses of the base resin and of the reactive diluent, respectively, in the impregnating resin.

4. The electrical insulation body as claimed in claim 1, wherein the base resin is a resin that is not free-radically polymerizing and comprises an epoxy resin, a polyesterimide, a polyester, and/or a polyurethane.

5. The electrical insulation body as claimed in claim 4, wherein the polyesterimide comprises an unsaturated polyesterimide.

6. The electrical insulation body as claimed in claim 4, wherein the polyester comprises an unsaturated polyester.

7. The electrical insulation body as claimed in claim 1, wherein the base resin is an epoxy resin.

8. The electrical insulation body as claimed in claim 1, wherein the vinyltoluene comprises o-vinyltoluene, m-vinyltoluene and/or p-vinyltoluene.

9. The electrical insulation body as claimed in claim 1, wherein the alkanediol diacrylate comprises hexanediol diacrylate and/or 1,6-hexanediol diacrylate.

10. The electrical insulation body as claimed in claim 1, wherein the nanosize particles are inorganic particles.

11. The electrical insulation body as claimed in claim 1, wherein the nanosize particles are inorganic particles comprising aluminum oxide, aluminum hydroxide, silicon dioxide, titanium dioxide, rare earth oxide, alkali metal oxide, metal nitride and/or sheet silicates comprising exfoliated or partially exfoliated sheet silicates.

12. The electrical insulation body as claimed in claim 1, wherein a ratio m(impregnating resin)/(m(impregnating resin)+m(electrical insulation tape)) is from 0.1 to 0.6, where m(impregnating resin) and m(electrical insulation tape) are the masses of the impregnating resin and of the electrical insulation tape, respectively, in the electrical insulation body.

13. The electrical insulation body as claimed in claim 1, wherein the electrical insulation tape comprises mica and/or aluminum oxide.

14. A process for producing an electrical insulation body having an electrical insulation tape, comprising:
   a) producing an impregnating resin, wherein the impregnating comprises;
      a base resin, a filler having nanosize particles and a free-radically polymerizing reactive diluent,
      a crosslinker for crosslinking the base resin and the reactive diluent,
      wherein the reactive diluent is styrene, vinyltoluene, an alkyl acrylate and/or alkanediol diacrylate, and
      wherein the crosslinker is bicycle[2.2.1]hept-5-ene-2,3-dicarboxylic anhydride,
      1-methylbicyclo[2.2.1]hept-5-ene-2,3-dicarboxylic anhydride,
      2-methylbicyclo[2.2.1]hept-5-ene-2,3-dicarboxylic anhydride, 5-methylbicyclo[2.2.1]hept-5-ene-2,3-dicarboxylic anhydride, and/or 7-methylbicyclo[2.2.1]hept-5-ene-2,3-dicarboxylic anhydride and wherein the producing step comprises a1) mixing of the filler with the reactive diluent; and a2) mixing of the reactive diluent with the base resin;

b) impregnating the electrical insulation tape with the impregnating resin; and c) curing of the impregnating resin including crosslinking the reactive diluent with the base resin using the crosslinker.

15. The process as claimed in claim 14, wherein the process further comprises:

a3) adjustment of a viscosity of the impregnating resin by increasing the viscosity by addition of an oligomer of the base resin or an oligomer of a component of the base resin.

16. The process as claimed in claim 15, wherein the oligomer is of an epoxide having at least two epoxide groups, an oligomer of bisphenol A diglycidyl ether and/or an oligomer of bisphenol F diglycidyl ether.

\* \* \* \* \*